Patented Jan. 2, 1945

2,366,409

UNITED STATES PATENT OFFICE 2,366,409

TREATMENT OF TERPENE ALCOHOLS

Alan C. Johnston, Washington, D. C., assignor to Hercules Powder Company, Wilmington, Del., a corporation of Delaware No Drawing. Application March 29, 1941, Serial No. 385,865

14 Claims. (Cl. 260—626)

This invention relates to a method of treating certain terpene alcohols, and more particularly it relates to a process for converting tertiary hydroxymenthenes to hydroxymenthanes and to certain aromatic derivatives. It also relates to the products obtained by the treatment.

Hydroxymenthenes, usually in the form of alpha-terpineol or terpene cuts rich therein, represent a raw material available at low cost in large quantities. The material is useful per se as a surface active agent, but has certain disadvantages, such as a rather high freezing point. It also provides a starting point for the preparation of more valuable materials not heretofore commercially available. The present invention is concerned with a treatment which improves hydroxymenthene fractions, and which may be carried further to lead to the production of more valuable compounds.

It is an object of this invention to treat fractions rich in alpha-terpineol or rich in other 8-hydroxymenthenes in a manner to reduce the freezing point of the fraction. It is a further object to treat such fractions in a manner to reduce the unsaturation of the components thereof. It is a still further object to provide a surface active agent of the general characteristics of alpha-terpineol and pine oil, but having a lowered freezing point and a decreased unsaturation.

It is also an object of this invention to provide a method for the preparation of 8-hydroxycymene from an 8-hydroxymenthene such as alpha-terpineol. It is also an object to provide a method for the preparation of 8-hydroxymenthane from an 8-hydroxymenthene. It is also an object to provide a method for the preparation of an isopropyltoluene from alpha-terpineol or from other 8-hydroxymenthenes. Other objects will appear hereinafter.

Now in accordance with this invention, these objects are attained by treatment of an 8-hydroxymenthene which comprises subjecting the compound or a fraction rich therein to the action of a dehydrogenation catalyst until an appreciable reduction in the unsaturation of the material being treated has taken place. The treatment involves a reaction of the 8-hydroxymenthene with itself, as a result of which a portion of the compound gains hydrogen atoms to become an 8-hydroxymenthane, and another portion of the compound loses hydrogen atoms to become an aromatic compound; i. e., an 8-hydroxycymene. No hydrogen is added to the reactant, the reduction in unsaturation being brought about in the absence of free hydrogen. The treatment may be continued for a time sufficient merely to bring about an appreciable decrease in unsaturation, or until further decrease in unsaturation ceases. The product of the treatment may be used as obtained, or component compounds may be recovered from the reaction mixture. By the additional step of subjecting to dehydration the 8-hydroxycymene formed by the treatment mentioned, there is formed from the original alpha-terpineol or other 8-hydroxymenthene the useful hydrocarbon, isopropenyltoluene.

The starting material for the method in accordance with this invention may be any 8-hydroxymenthene. The carbon structure of the menthenes will be found in Bernthsen, Textbook of Organic Chemistry, Sudborough Revision, 1922 edition D. Van Nostrand Company, New York, New York, page 609 and page 613. The system of numbering the carbon atoms shown there will be utilized herein. It will be appreciated that the methyl group represented by carbon No. 7 may be in the para position corresponding to carbon No. 1, or it may be in the ortho or meta position with respect to the isopropyl group. 8-hydroxymentha-dienes are included within the term 8-hydroxymenthene.

The hydroxymenthene may be in the form of a pure compound, or it may be in the form of a terpene cut reasonably rich therein. For example, alpha-terpineol may be utilized in a fairly pure state, or it may be utilized in the form of ordinary commercial pine oil, which is usually a mixture of terpene alcohols. It will be understood that where the 8-hydroxymenthene utilized has the para carbon structure, as is the case with alpha-terpineol, the derivatives will also have their carbon structures in the para position. Similarly, ortho- and meta-hydroxymenthenes lead to ortho and meta products respectively.

The catalyst which is utilized in the method according to this invention may be one or more of the dehydrogenation type. Metals of group 8 of the periodical table having an atomic weight above 100 and reduced oxides of these metals are, for example, particularly suitable as they have substantially no dehydrating action. Of this group of materials, palladium represents the most efficient catalyst. It will be noted that these materials function both as hydrogenation catalysts and as dehydrogenation catalysts. The catalyst may be used in the finely divided condition in suspension in the reactant, or it may be supported upon a catalyst carrier for use in suspension, or as a catalyst bed. Such catalyst carriers as, for example, silica, alumina, charcoal, coke, kieselguhr, and the like are suitable. It is desirable to avoid carriers which cause dehydration of tertiary alcohols since the catalyst structure should be non-dehydrating. The reaction according to this invention requires temperatures somewhat above ordinary room temperatures and of such elevation to bring about the reaction with the catalyst employed. The temperature is limited, however, to temperatures below those at which any great amount of dehydration of tertiary alcohols is caused by the particular catalyst structure utilized. The temperatures of reaction which meet these requirements will be in the range between about 80° and about 150° C. Best results are obtained when the temperature is between about 90° and about 110° C. The reaction occurs at any pressure, ordinary atmospheric pressures being suitable.

The reaction is in general, but not necessarily, carried out with the presence of solvents other than the materials ordinarily associated with the 8-hydroxyparamenthene utilized. However, if desired, diluents such as benzene, toluene, petroleum ether, ethyl acetate, methyl acetate, and the like may be used. Other terpene alcohols such as beta- and gamma-terpineols, terpinenol-1, terpinenol-4, borneol, isoborneol, fenchyl alcohol, and the like or mixtures thereof may also be present if desired.

The 8-hydroxymenthene is subjected to the action of the dehydrogenation catalyst at the particular temperature utilized, at least until an appreciable reduction in the unsaturation of the material is obtained. The reaction is readily followed by means of the change in iodine number of the material. A typical course of reaction is given by the procedure of Example I, which is given later. Under the conditions of Example I, the following drop in iodine number was obtained during the reaction period given in the following table:

| Minutes | Approximate iodine number |
|---|---|
| 0 | 165 |
| 30 | 38 |
| 60 | 11.5 |
| 90 | 4.8 |
| 120 | 3.0 |
| 1,020 | 1.8 |

An "appreciable" reduction in unsaturation would be a reduction of at least about 16 units in the iodine number. This would correspond to a reaction of at least about 10% of the 8-hydroxymenthene present. In many cases where it is intended to recover the conversion products in maximum yield, the reaction will be continued until substantially no further decrease in unsaturation is obtained. Decrease in unsaturation may also be followed by determining thiocyanogen number.

The nature of the products obtained is illustrated by the treatment of alpha-terpineol or a fraction containing alpha-terpineol. Pure alpha-terpineol substantially completely reacted by the method in accordance with this invention yields a mixture of the saturated terpene alcohol 8-hydroxyparamenthane, which is sometimes known as dihydroterpineol and 8-hydroxyparacymene. The two components will be present in very nearly a 2:1 ratio, the 8-hydroxyparamenthane predominating. Thus, there is produced a mixture of a saturated terpene alcohol and an aromatic derivative which is also saturated, the benzene ring being considered saturated as the term is used herein. Substantially complete reaction of a fairly pure alpha-terpineol brings about substantial elimination of unsaturation.

A less pure raw material represented, for example, by a commercial alpha-terpineol cut such as pine oil will yield in ultimate product somewhat less saturated due to the presence of unsaturated diluent materials not affected by the reaction. It will also be appreciated that for many applications less complete reaction leading to less saturated products will be entirely satisfactory.

The method in accordance with this invention yields compositions which are useful as surface active agents and solvents, such as for cellulose ester lacquers and for resin-containing varnishes. Terpineol, or pine oil, treated by the method in accordance with this invention yields compositions of excellent characteristics of this nature, and at the same time of a considerably reduced freezing point as compared with the material treated. The product obtained by complete reaction of pure terpineol comprises the terpene alcohol 8-hydroxyparamenthane and 8-hydroxyparacymene. When a terpineol fraction such as pine oil is merely reacted until an appreciable reduction in saturation is achieved, say forming 10% or more of reaction products, the products will comprise terpineol, 8-hydroxyparamenthane, and 8-hydroxyparacymene. Such a partial reaction is readily carried out by reacting until an appreciable drop in freezing point of the mixture, such as at least about 5° C. is obtained, the product being particularly valuable for use as a surface active agent. In this manner, pine oil compositions with a freezing point below about 0° C. are obtained.

The method in accordance with this invention provides a means of obtaining 8-hydroxyparacymene in an economical manner. This compound may be obtained from the reaction mixture, preferably after complete reaction, by solvent extraction. One such method comprises dissolving the reaction product in petroleum ether and extracting 8-hydroxycymene with liquid sulphur dioxide. The sulphur dioxide removes a fraction rich in the 8-hydroxycymene from which residual 8-hydroxyparamenthane may be removed by counter-extraction with petroleum ether. The material which remains in the petroleum ether is a fraction rich in 8-hydroxyparamenthane which may be enriched further or purified by repeated extractions with liquid sulphur dioxide.

The method in accordance with this invention further furnishes a means of obtaining the hydrocarbon, isopropenyltoluene, by subjecting the reaction product to the additional step of dehydrating the 8-hydroxycymene contained therein. The dehydration step may be applied to the 8-hydroxycymene after isolation thereof to give a relatively pure isopropenyltoluene, or it may be applied to the crude reaction mixture, and the isopropenyltoluene separated from the resulting mixture by distillation. The dehydration treatment is carried out by heating the 8-hydroxycymene or fraction containing this compound, preferably in the presence of a dehydrating agent such as fuller's earth, iodine and copper gauze, sodium acid sulphate, a mixture of fuller's earth and phthalic anhydride, activated or inactivated silica gel, activated or inactivated alumina, and the like. The isopropenyltoluene is useful as a solvent and for the preparation of other compounds.

The method in accordance with this invention will be illustrated by the specific examples thereof which follow. All parts and percentages are by weight unless otherwise specified.

Example I

A dehydrogenation catalyst of the supported palladium type was prepared in the following manner. A solution consisting of 5 parts of palladium chloride dissolved in 25 parts of aqueous hydrochloric acid containing 7.5 parts of HCl was mixed with 60 parts of 40-80 mesh activated alumina. Five parts of formalin were then added and thoroughly mixed into the mass. Forty parts of water containing 4 parts of sodium hydroxide were then mixed into the resulting mass. The mass was then filtered, washed twice with 50 parts of water, once with 50 parts of 20% acetic acid, and finally with water until neutral to litmus.

Alpha-terpineol was treated by the method in accordance with this invention by heating 100 parts of the alpha-terpineol (melting point, 34-35° C.) with 20 parts of the supported palladium catalyst at 96-98° C. with mechanical agitation. The course of the reaction was followed by periodically determining the iodine number of the reacting mixture. The following iodine numbers were obtained after the various periods of reaction indicated.

| Minutes | Iodine number |
|---|---|
| 0 | 165 |
| 30 | 38 |
| 60 | 11.5 |
| 90 | 4.8 |
| 120 | 3.0 |
| 1,020 | 1.8 |

The reaction product was recovered by filtration thereof from the catalyst. It consisted essentially of 8-hydroxyparamenthane and 8-hydroxyparacymene in very nearly a 2:1 proportion. It will be seen that under the conditions of this example a modified alpha-terpineol of greatly reduced saturation is obtained in 30 minutes. However, where the object of the reaction is to obtain the maximum quantity of 8-hydroxyparacymene or a derivative thereof, it is desirable to conduct the reaction for a period of 90 minutes or more.

Example II

A mixture consisting of 94 parts of distilled alpha-terpineol, 5 parts of supported palladium catalyst prepared as described in Example I, and 80 parts of cyclohexane was heated under reflux with facilities for measuring any water given off. The reaction mixture was boiled for a time at 98° C. During this period no water was collected, indicating that no dehydration was taking place. Twelve parts of cyclohexane were distilled off to allow the temperature of the liquid in the reaction mixture to rise to 102.5° C. During 16 hours refluxing at this temperature 0.4 part of water was recovered, showing negligible dehydration to be taking place. The reaction product was then recovered by filtration from the catalyst and by removal of the cyclohexane by distillation. The final iodine number was 9.

Example III

A mixture consisting of 25 parts of pine oil (containing alpha-terpineol, borneol, isoborneol and fenchyl alcohol) and 5 parts of supported palladium catalyst of the type utilized in Example I was heated with agitation for 48 hours at 96-98° C. The iodine number dropped to 10, alpha-terpineol present being converted to a considerable extent to 8-hydroxyparacymene and 8-hydroxyparamenthane. The treatment lowered the freezing point to below −10° C. The product was useful as a detergent aid, wetting-out agent, and in flotation of minerals.

Example IV

In this example a natural pine oil of the type comprising 60-80% of alpha-terpineol was treated to lower the freezing point. Two hundred parts of the pine oil and 100 parts of supported palladium catalyst of the type utilized in Example I were heated 16 hours at 96-98° C. The iodine number was thereby lowered to about 70, and the freezing point of the pine oil was reduced from 2° C. to below −40° C. The resulting product had excellent wetting-out properties as a detergent aid, and was found to be effective in the flotation of minerals.

Example V

A mixture of 200 parts of pine oil and 15 parts of a dehydrogenation catalyst consisting of activated platinum supported on charcoal (4.75% platinum) was heated for 24 hours at 96-98° C. The resulting product was then recovered by filtration from the catalyst. The properties of the pine oil before and after this treatment are given below:

|  | Before | After |
|---|---|---|
| Tertiary alcohol content | 77.8 | 78.2 |
| Specific rotation | +11.6 | +10.3 |
| Refractive Index $N_D^{20}$ | 1.4820 | 1.4845 |
| Viscosity at 100° F. (sec.) | 65.5 | 101.2 |
| Freezing point °C | +6.3 | −22 |
| Iodine number | 141.3 | 109.1 |

Example VI

Pure alpha-terpineol was treated with a supported palladium dehydrogenation catalyst in the manner described in Example I for 120 minutes. 8-hydroxyparacymene was then recovered from the resulting product in the following manner. One hundred cubic centimeters of the reaction product were mixed with 100 cubic centimeters of petroleum ether. The resulting solution was extracted with liquid sulphur dioxide at −70° C. The resulting sulphur dioxide solution was counter-extracted with 75 cubic centimeters of petroleum ether. The sulphur dioxide solution was then evaporated, resulting in a fraction rich in 8-hydroxyparacymene.

Example VII

In this example alpha-terpineol was reacted by the method in accordance with this invention to form isopropenyltoluene, the process comprising formation of 8-hydroxyparacymene and dehydration thereof to the isopropenyltoluene. Pure alpha-terpineol was reacted for 120 minutes in the manner described in Example I. The product obtained was then treated by distilling 100 parts slowly in a current of carbon dioxide from a mixture consisting of the reaction product, ½ part of iodine, and some copper gauze.

In this manner 76.5 parts of oily distillate, 11.4 parts of water, and 9.5 parts of residue were obtained. The oily distillate was then fractionated. A fraction composed of 13 parts of the desired product with a boiling point around 190–195° C. and a refractive index of 1.5362 (refractive index of pure 8,9-isopropenyltoluene is 1.526) was obtained. A fraction composed of 46 parts having a refractive index of 1.4465 and another fraction composed of 2.5 parts having a refractive index of 1.4773 boiling at about 170–175° C. were also obtained.

*Example VIII*

In this example isopropenyltoluene was prepared from alpha-terpineol. The alpha-terpineol was treated for 120 minutes in the manner described in Example I. The reaction product was filtered from the catalyst, and 250 parts thereof were heated with 5 parts of sodium acid sulphate for one hour under a blanket of carbon dioxide. Fractionation of the product at an absolute pressure of 25 mm. gave the following products:

| Fraction | Boiling Point | Pressure | Volume | $N_D^{20}$ | Content of isopropenyltoluene |
|---|---|---|---|---|---|
|  |  | Mm. |  |  | Per cent |
| 1 | 70–78.8 | 25 | 20 | 1.4818 | 28 |
| 2 | 80.5–90 | 25 | 59 | 1.5088 | 70 |
| 3 | 90–94 | 25 | 21 | 1.5078 | 68 |
| 4 | 94–100 | 25 | 10 | 1.4936 | 47 |
| 5 | 103–105.2 | 25 | 26 | 1.4715 |  |
| 6 | 106–107 | 25 | 86 | 1.4650 |  |
| Residue |  | 25 |  |  |  |

A portion of the sodium acid sulphate dehydration product was also fractionated at an absolute pressure of 4 mm. in a Podbielniak column using a 10:1 reflux ratio. The following products were obtained.

| Boiling point | Volume | $N_D^{20}$ | Isopropenyltoluene |
|---|---|---|---|
|  |  |  | Per cent |
| 86.2–91.0 | 10.8 | 1.4890 | 39 |
| 91.0–95.0 | 18.6 | 1.5180 | 84 |
| 101–105 | 20.0 | 1.5300 | 100 |
| 105.5–117.4 | 5.5 |  |  |

The second and third fractions represent products of high purity.

It will be understood that the details and examples hereinbefore set forth are illustrative only and that the invention as broadly described and claimed is in no way limited thereby.

What I claim and desire to protect by Letters Patent is:

1. A process for the conversion of 8-hydroxymenthenes to products of decreased apparent unsaturation but of similar hydroxyl content which comprises treating an 8-hydroxymenthene at a temperature between about 80° C. and about 150° C. in the absence of added hydrogen with a catalyst containing a dehydrogenating metal as an active ingredient, until the 8-hydroxymenthene is at least partially converted to a mixture of 8-hydroxymenthane and 8-hydroxycymene, and separating the resulting product from the catalyst.

2. A process for the conversion of alpha-terpineol to products of decreased apparent unsaturation but of similar hydroxyl content which comprises treating alpha-terpineol at a temperature between about 80° C. and about 150° C. in the absence of added hydrogen with a catalyst containing a dehydrogenating metal as an active ingredient, until the alpha-terpineol is at least partially converted to a mixture of 8-hydroxymenthane and 8-hydroxycymene, and separating the resulting product from the catalyst.

3. A process for improving pine oil which comprises treating the pine oil at a temperature between about 80° C. and about 150° C. in the absence of added hydrogen with a catalyst containing a dehydrogenating metal as an active ingredient, until the freezing point of the pine oil has been lowered at least 5° C. by the treatment, and separating the resulting pine oil from the catalyst.

4. A process for the conversion of 8-hydroxymenthenes to products of decreased apparent unsaturation but of similar hydroxyl content which comprises treating an 8-hydroxymenthene at a temperature between about 80° C. and about 150° C. in the absence of added hydrogen with a dehydrogenation catalyst which contains as an active ingredient an element of group 8 of the periodic table having an atomic weight above 100, until a drop of at least 16 in iodine number of the material is brought about by the treatment, and recovering from the resulting mixture a fraction rich in an 8-hydroxymenthane and a fraction rich in an 8-hydroxycymene.

5. A process for the conversion of alpha-terpineol to products of decreased apparent unsaturation but of similar hydroxyl content which comprises treating the alpha-terpineol at a temperature between about 80° C. and about 150° C. in the absence of added hydrogen with a dehydrogenation catalyst containing as an active ingredient an element of group 8 of the periodic table having an atomic weight above 100, until a drop of at least 16 in iodine number of the alpha-terpineol is brought about by the reaction, and recovering a fraction rich in 8-hydroxyparamenthane and a fraction rich in 8-hydroxyparacymene.

6. A process for improving pine oil which comprises subjecting the pine oil to treatment at a temperature between about 80° C. and about 150° C. in the absence of added hydrogen to treatment with a dehydrogenation catalyst containing as an active ingredient an element of group 8 of the periodic table having an atomic weight above 100, until the freezing point of the pine oil has been lowered at least 5° C. by the treatment, and recovering the improved pine oil.

7. A process for the conversion of 8-hydroxymenthenes to products of decreased apparent unsaturation but of similar hydroxyl content which comprises treating the 8-hydroxyparamenthene at a temperature between about 80° C. and about 150° C. in the absence of added hydrogen with a dehydrogenation catalyst containing palladium as an active ingredient, until a drop of at least 16 in iodine number is obtained in the material by the treatment, and separating the resulting product from the palladium catalyst.

8. A process for the conversion of alpha-terpineol to products of decreased apparent unsaturation but of similar hydroxyl content which comprises treating the alpha-terpineol at a temperature between about 80° C. and about 150° C. in the absence of added hydrogen with a dehydrogenation catalyst containing palladium as an active ingredient, until a drop of at least 16 in iodine number is obtained in the material by the treatment, and separating the resulting product from the palladium catalyst.

9. A process for improving pine oil which comprises treating the pine oil at a temperature between about 80° C. and about 150° C. in the absence of added hydrogen with a dehydrogenation catalyst containing palladium as an active element, until a drop of at least 5° C. in the freezing point of the pine oil is obtained by the treatment, and separating the improved pine oil from the palladium catalyst.

10. A process which comprises treating an 8-hydroxymenthene at a temperature between about 80° C. and about 150° C. in the absence of added hydrogen with a catalyst containing a dehydrogenating metal as an active ingredient, until the 8-hydroxymenthene is at least partially converted to a mixture of 8-hydroxymenthene and 8-hydroxycymene, dehydrating the 8-hydroxycymene to form isopropenyltoluene, and recovering the isopropenyltoluene.

11. A process which comprises treating an 8-hydroxyparamenthene at a temperature between about 80° C. and about 150° C. in the absence of added hydrogen with a dehydrogenation catalyst containing an element of group 8 of the periodic table having an atomic weight above 100 as the active ingredient, until the ethylenic unsaturation of the resulting reaction mixture ceases to change substantially, heating the resulting mixture with a dehydrating agent to convert 8-hydroxycymene in the mixture to isopropenyltoluene, and fractionating the resulting product to recover the isopropenyltoluene.

12. A process which comprises treating alpha-terpineol at a temperature between about 80° C. and about 150° C. in the absence of added hydrogen with a dehydrogenation catalyst containing an element of group 8 of the periodic table having an atomic weight above 100 as the active ingredient, until the ethylenic unsaturation of the resulting reaction mixture ceases to change substantially, treating the 8-hydroxyparacymene formed in the reaction with a dehydrating agent to convert it to para-isopropenyltoluene, and recovering the para-isopropenyltoluene.

13. A process which comprises treating alpha-terpineol at a temperature between about 80° C. and about 150° C. in the absence of added hydrogen with a dehydrogenation catalyst containing palladium as the active element, until the alpha-terpineol is at least partially converted to 8-hydroxyparamenthane and 8-hydroxyparacymene, dehydrating the 8-hydroxyparacymene to form para-isopropenyltoluene and recovering the para-isopropenyltoluene.

14. A process which comprises treating alpha-terpineol at a temperature between about 80° C. and about 150° C. in the absence of added hydrogen with a dehydrogenation catalyst comprising palladium as the active element, until the alpha-terpineol is at least partially converted to a mixture of 8-hydroxyparamenthane and 8-hydroxyparacymene, heating the mixture so obtained with sodium acid sulfate as a dehydrating agent to convert the 8-hydroxyparacymene to para-isopropenyltoluene and fractionating the resulting mixture to obtain a hydrocarbon fraction rich in para-isopropenyltoluene.

ALAN C. JOHNSTON.